Nov. 19, 1957 E. H. VOIGTMAN ET AL 2,813,596
DISPOSABLE FILTER BAG
Filed Dec. 2, 1953 2 Sheets-Sheet 1
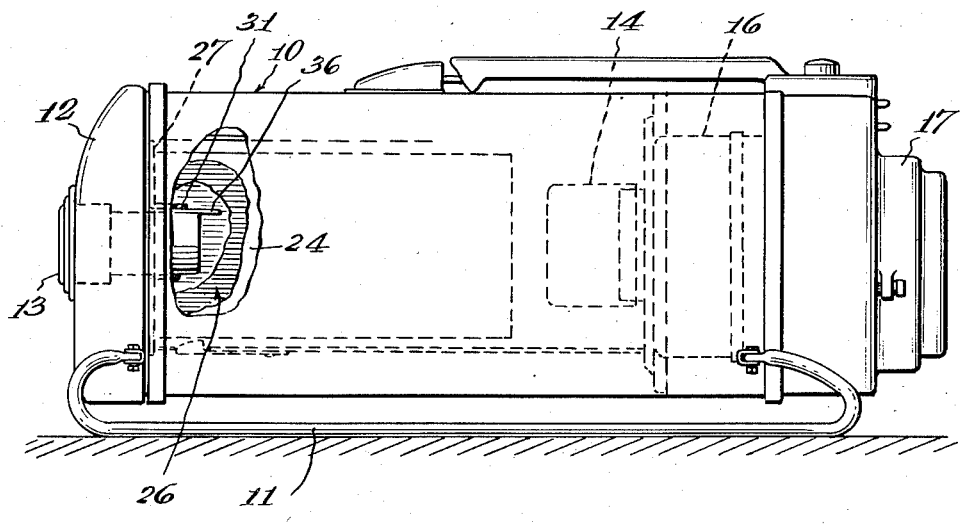
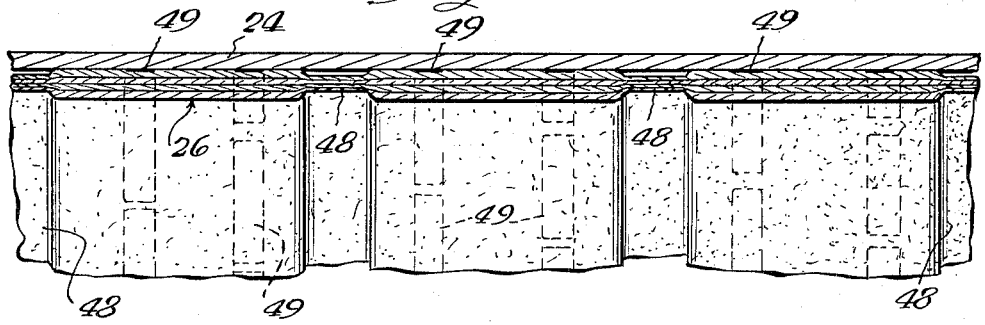
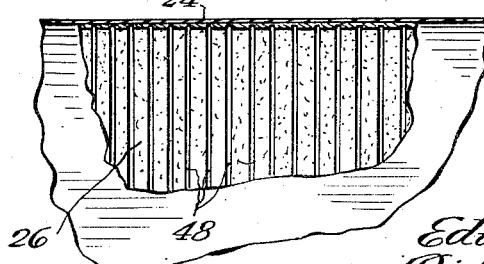
Inventors
Edward H. Voigtman
Richard A. Wolterding
By Isaac, Glaister & Anderson
Attorneys

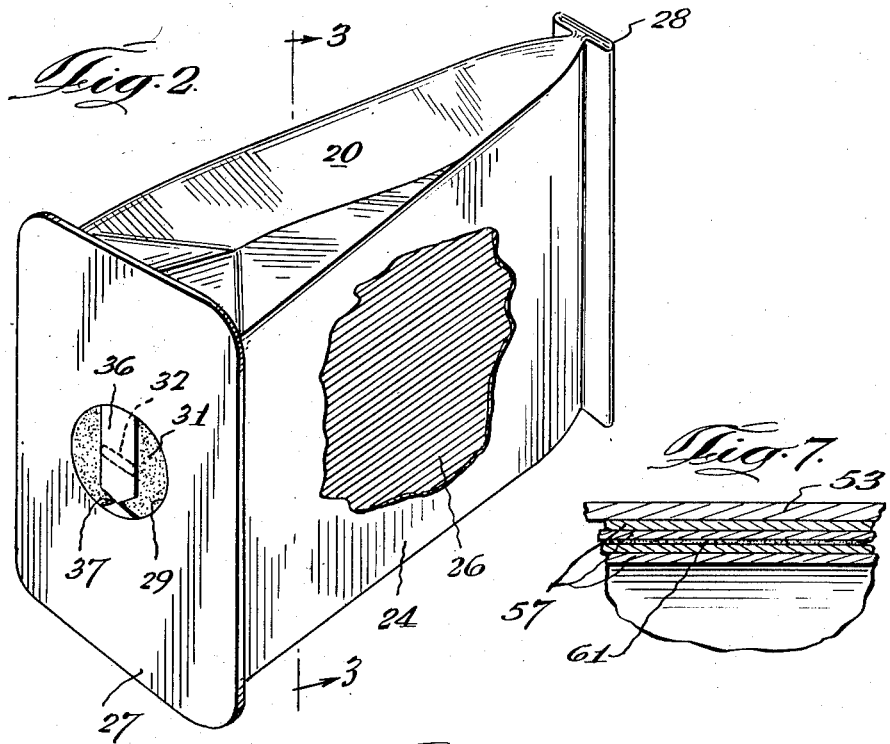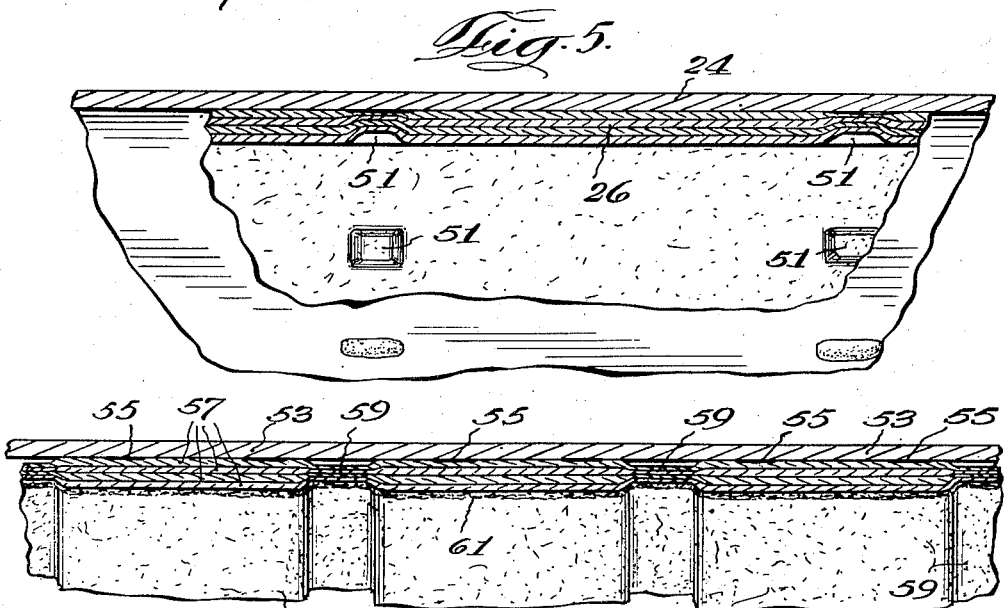

United States Patent Office 2,813,596
Patented Nov. 19, 1957

2,813,596

DISPOSABLE FILTER BAG

Edward H. Voigtman and Richard A. Wolterding, Neenah, Wis., assignors, by mesne assignments, to Kimberly-Clark Corporation, a corporation of Delaware Application December 2, 1953, Serial No. 395,773

9 Claims. (Cl. 183—69)

The present invention is concerned with filtering devices and particularly with filter bag units adapted for use as disposable dust containers in vacuum or suction cleaners.

In recent years there has been increasing use in the vacuum cleaner art of disposable, paper, filter bags in place of the older, more conventional, fabric filter bags. The disposable type bags are much easier to handle and to use than fabric bags; they are more sanitary than fabric bags; and they have other advantages from the operational and merchandising viewpoints. The replacement of fabric bags by paper bags has been of especial importance in tank type vacuum cleaners. In fact, the use of such bags is almost essential in the automatic bag ejector type cleaner.

In this latter equipment, the vacuum cleaner includes a mechanism which is automatically operable to stop the vacuum cleaner and to eject the filter bag from the tank receptacle when the functional efficiency of the vacuum cleaner has been reduced below a predetermined value. An example of a mechanism of this type is described in U. S. Patent No. 2,634,819 to Cranmer.

Most of the automatic bag ejection mechanisms now in use operate on the rather well-established principle that the pressure drop across a vacuum cleaner filter bag is an accurate index of the performance of the cleaner. Hence, these mechanisms are so arranged that when the pressure drop across the filter bag reaches a predetermined value, the cleaner is shut off and the filter bag is ejected. This operational principle imposes a number of very severe, and to some extent conflicting, requirements on the filter bag unit, and in the past, these requirements have not been adequately met.

To accomplish the intended function of the vacuum cleaner, the filter bag must remove from the stream of air which is being forced through the cleaner a very high percentage of the dust particles carried in that stream, and especially the dust particles in the smaller sizes, i. e., those having diameters of 8 microns, or less. Such small particles frequently constitute a high percentage of the dust in an air stream. At the same time, to assure satisfactory air flow, the filter bag should maintain an adequate porosity throughout its operating life. Additionally, the operating life should be of a reasonable length.

The disposable, paper filter bags available in the past have failed to meet one or more of these requirements. In order to filter out the small particles at the high flow rates required, it has been found necessary to use paper bags of a type which tend to become clogged after rather short periods of use, especially when the cleaner is called upon to handle considerable amounts of fine dust. The use of more porous bag material increases the period in which the bag becomes clogged, but decreases its filtering ability. The problem of attaining adequate life at high cleaning efficiency is of importance in both the automatic bag-ejection type and the non-automatic cleaner. In the non-automatic type, loss of porosity in the bag merely results in decreased over-all efficiency of the cleaner, but in the automatic unit, the cleaner additionally becomes inoperable until a new bag is inserted. This premature loss of effectiveness of the cleaner in both the automatic and non-automatic type is therefore wasteful and can also be annoying to the user.

There is, therefore, a need for an improved dust collecting, disposable container or filter bag for automatic and other types of vacuum cleaners, and the provision of such a container constitutes the principal object of the present invention.

As will hereinafter appear, this object is accomplished by the provision of a disposable filter bag which includes in its construction a permeable outer wrapper or support sheet of strong, porous backing material having filtering characteristics and a liner containing at least one ply of thin, creped cellulosic wadding of certain specific types, with or without additional fibrous material. The outer wrapper may comprise material such as a moderately heavy weight paper, a relatively heavy cellulosic wadding, an air permeable thermoplastic film, or a non-woven fabric. The combination is so disposed in the filter unit that the air flows through the wadding prior to contacting the heavier weight backing. The particular combination of materials possesses remarkable and quite unexpected filtering capacity. Vacuum cleaner filter bags made in accordance with the invention retain a high degree of filtering capacity and efficiency over much greater periods of time than has heretofore been considered possible for any type of filter bag. At the same time, the filter bag units maintain a high porosity with resultant high rates of air flow through a prolonged operating period. Further, the filtering characteristics of the combination are greatly improved over the individual capabilities of the materials when used separately.

The various features and advantages of the invention will be made more apparent in the following description and in the accompanying drawings, wherein are shown certain illustrative embodiments of the invention.

In the drawings:

Figure 1 is a side elevational view, partially broken away, illustrating the filter bag of the invention in position in an automatic bag-ejecting, type vacuum cleaner;

Figure 2 is a perspective view of the filter bag unit illustrated in Figure 1, a portion of the bag unit being partially broken away to better show the interior construction;

Figure 3 is a fragmentary, greatly enlarged, sectional view, taken on the general line 3—3 of Figure 2, showing certain of the details of construction of the filter bag;

Figure 4 is a view similar to Figure 3, but to a less enlarged scale;

Figure 5 is a greatly enlarged, fragmentary view, similar to Figure 3, illustrating a different embodiment of the bag structure of the present invention;

Figure 6 is another greatly enlarged, fragmentary view, illustrating a further modification of the filter bag of the present invention; and Figure 7 is another greatly enlarged, fragmentary view of a further modified form of filter bag.

In Figure 1, reference numeral 10 indicates generally the casing of a tank type vacuum cleaner which is provided with a pair of runners 11 by means of which the cleaner may be moved along the floor or other supporting surface during use. Hinged to the casing 10 is a releasably latched, swingable cover 12 which includes a connecting coupling 13 arranged to receive a flexible hose in the usual manner.

Located within the casing 10 are an ejecting mechanism generally indicated at 14 and a motor fan unit 16 which draws the dust-laden air through the filter and passes the cleaned air through an axial opening in an end cap 17. The end cap 17 may also include an additional filter unit.

The details of the mechanism for disengaging the cover 12 from the casing 10 when the pressure differential across the unit reaches a predetermined value has not been shown in detail, since this forms no part of the invention. For a description of the mechanism employed in a typical automatic ejecting unit, reference is invited to the aforementioned Cranmer Patent 2,634,819, issued on April 14, 1953.

Supported within the casing 10 is a filter bag unit 20, this unit including an outer wrapper or support layer 24 of paper and an inner liner 26 of cellulose wadding intimately associated with the paper wrapper 24. The general structure of the filter bag 20 is best illustrated in Figures 2 to 4, and as shown particularly in Figure 2, it includes an end plate 27, composed of stiff cardboard or the like, and walls which terminate in folded-over end portions indicated at 28. The end plate 27 is centrally apertured, as shown at 29, and the aperture 29 is covered over with a thin, flexible diaphragm 31 composed of rubber or similar material. The diaphragm 31 has a centrally disposed slot 32 which receives the inner end of the coupling 13 as shown in Figure 1 when the cleaner is in operative condition.

In order to provide at least a partial seal for the apertured end of the bag unit during the bag changing operation, the end plate 27 is provided with a paper strip 36 having a weakened portion 37 close to one end. Upon insertion of the coupling 13 into the rubber diaphragm, the strip 36 breaks at the weakened portion 37 and is forced inwardly of the slot 32. When the filter bag is disengaged from the coupling 13, as during the automatic bag ejection operation, the natural resilience of the strip 36 provides a fairly effective seal by closing off the slit 32 in the diaphragm 31. The described structure of the end plate for the vacuum cleaner bag also forms no part of the present invention, as it is described and claimed in U. S. Patent No. 2,596,808 to Lofgren.

The foregoing description indicates the manner in which a filter bag unit in accordance with the present invention can be used in one type of automatic bag ejecting vacuum cleaner. It will be appreciated that the bag structure of itself will be useful in other types of vacuum cleaners, whether provided with the automatic ejecting mechanism or not.

As previously pointed out, the important advantages of the filter bag of the present invention result from the particular combinations and arrangements of the materials embodied in its construction. In the representative embodiments of the invention illustrated in the drawings, the filter bag includes an outer wrapper or support layer consisting of a single ply of rather porous, but strong, paper and a liner which preferably comprises a plurality of plies of creped, cellulosic tissue or wadding intimately associated with the outer wrapper.

The physical characteristics of the wadding and the relation of the wadding plies to the support layer are of critical importance in accomplishing the invention. Generally, from about 1 to 10 plies of cellulosic wadding having an uncreped basis weight within the range of from about 3–7 pounds per standard ream of 2880 square feet, and a crepe ratio within the range of from about 1.2 to 3.0 should be used. The preferred material has an uncreped basis weight within the range of about 4.5 to 5.0 pounds per standard ream, and a crepe ratio within the range of about 1.8 to 2.2. The above basis weight figures are for normal air-dry wadding, which may contain up to about 5 to 7 percent moisture, by weight. The wadding or tissue sheets are preferably made of a high grade, chemical pulp furnish, and should be manufactured under such conditions that the porosity of a four ply product with about 2 percent of the area embossed to hold the plies together is within the range of about 280 to 350 cubic feet of air per minute, per square foot of sheet area, at a water pressure drop of ½ inch, as measured by a Frazier permeometer, or equivalent instrument.

For convenience in handling and to attain the best overall filtering characteristics, it is desirable that the wadding sheets be fastened together into a single multiply sheet or layer by an embossing or equivalent means. The embossed areas which may comprise lines or separate small areas are not available for filtering purposes, and hence, it is desirable that they be restricted as much as possible, consistent with adequate joining of the sheets. Generally, the total embossed area should not exceed 35 percent of the total area of the wadding, and preferably should not exceed 5 percent. Discontinuous area embossed material is illustrated in Figure 5, and line embossed material is illustrated in the other figures of the drawings.

The paper or other porous material of which the outer wrapper is made may vary in characteristics somewhat more than the wadding or inner layer. In general, however, the sheet must be a porous, relatively strong sheet, and it desirably is a sheet capable of filtering dust particles from the air stream passing through the vacuum cleaner. The most satisfactory results have been obtained by the use of a sheet having a thickness less than .010 inch. The strength of the sheet must be sufficient to withstand the pressure existing during use of the filter bag, and it should also be sufficient to permit the bag units to be manufactured on automatic, bagmaking equipment. Generally, paper having a tensile strength of at least 5 pounds per lineal inch in both directions will be satisfactory. To permit the cleaner to be used with liquid shampoo materials, the sheet should have a wet strength of at least half of the dry strength. The porosity of the outer sheet is of particular importance, and should be within the range of 20 to 75 cubic feet per minute per square foot of the sheet area, at a water pressure drop of ½ inch, when measured by a Frazier permeometer, or equivalent instrument. In the case of a paper outer sheet, the recommended porosity is in the range from 30 to 60 cubic feet per minute per square foot.

In a particularly satisfactory embodiment of the invention which followed the construction illustrated in Figures 2 and 4, the outer wrapper or support layer 24 comprised a porous, relatively strong paper sheet having a thickness of .006 inch to .007 inch and a basis weight of 25 to 35 pounds per standard ream of 2880 square feet, a porosity of 40 to 50 cubic feet per minute per square foot at a water pressure drop of ½ inch, the other characteristics of the sheet being as described in the foregoing. The inner or wadding layer 26 comprised four plies of creped, cellulosic wadding or tissue having a drier (uncreped) basis weight of 4.75 pounds per standard ream and a crepe ratio of 2.1, the other characteristics in the sheet being also in accordance with the foregoing general description.

The wadding plies were joined together by spaced lines of embossing, as illustrated at 48 in Figures 3 and 4 of the drawings. There were six lines of embossing per inch; each line was approximately .04 inch wide, and the unembossed area of the combined sheets constituted approximately 75 percent of the total area of the wadding layer. The embossed wadding layer 26 was secured to the outer wrapper 24 so as to constitute a liner for the completed bag unit by a series of spaced lines or spots of adhesive, indicated generally at 49 in Figure 3. In this connection, it will be understood that various means can be used for joining together the wadding and wrapper layers, and that the layers are joined together primarily to aid in handling the material on bagmaking equipment. The lines of embossing in this embodiment of the invention extended longitudinally of the bag, but this is, of course, immaterial to the operation of the unit.

The individual sheets of wadding used in the composite filter bag structure of the invention may be fastened together by means other than line embossing; for example, as illustrated in Figure 5, the wadding plies may be joined together and joined to the backing sheet by spaced, discontinuous areas of embossing and adhesive, or by lines or dots of adhesive alone, as indicated generally at 51. Other means of attaching the wadding layer to the wrapper layer include the use of adhesively-coated threads, stitching, etc. Embossing, with or without an added adhesive, is the preferred means, because it is inherently quite inexpensive to accomplish.

Important improvement in the filtering efficiency and capacity of filter bag units utilizing the multiple layer construction of the present invention can be accomplished by the use of light weight appliques of fibers applied to the inner surface of the wadding layer (the surface which is initially contacted by the air stream), and an example of a bag construction embodying such an applique is illustrated in Figure 6. In that figure, which is a sectional view through a bag unit, similar to Figure 3, the outer wrapper or support layer 53, which may be a porous sheet similar to the previously described sheet 24, is illustrated at 53. Fastened to the outer wrapper by lines or spots of adhesive 55 are four layers 57 of creped, cellulosic wadding having weight and other characteristics within the ranges defined above.

The wadding layers 57 are joined together by lines of embossing, illustrated at 59, and a light-weight layer or applique 61 of cotton fibers having an average length within the range of from ⅛ to ¾ inch, applied to the inner surface of the multiply wadding layer. Surprisingly small amounts of fibers will improve the performance of the filter bag unit to an amazing degree. Generally, there is little advantage in using an applique of cotton or similar fibers in weights in excess of about 1 ounce per square yard of wadding material, and for most types of vacuum cleaner service, the applique should have a weight within the range of ¼ to ¾ ounce of fiber per square yard. The fiber may be adhesively attached to the wadding layers, as by the use of a fiber mixture which includes thermoplastic or adhesive fiber, together with the cotton or other fiber, or the natural adherence of fiber such as cotton to cellulosic tissue may be sufficient to hold the layer in place. In this connection, it will be understood that during use of the filter bag unit, the air flow reaches the fiber layer first, and hence, there is little or no tendency for the applique to become dislodged during use. In the case of vacuum cleaners having very high velocity air streams, it may be desirable to incorporate the fibers along an intermediate ply, instead of, or in addition to the fibers in the outer ply. Such a structure is shown in Figure 7 of the drawings.

Most conveniently, the fibers are applied to the wadding by discharging a uniform layer of carded fibers onto the top ply of the wadding, and then embossing all of the wadding plies with the fibers in place. The fibers may also be air-laid onto the wadding by apparatus which applies suction to one side of the wadding. The fibers should be applied so as to provide, in the completed structure, a fibrous surface having a nap or loft.

Useful fibers, in addition to cotton, include fibers of silk, linen, wool, rayon and various of the other natural and synthetic fibers used in the manufacture of thread and fabric.

To illustrate the remarkable improvement which is accomplished by the structural combinations and arrangements embodied in the filter bags of the invention, the filter bag was tested in a widely used test in the vacuum cleaner art for filter bags. This test employs a dust mixture made up of 1 part of 200 mesh or finer silica dust and 2 parts of 40/60 mesh silica dust. In making the test, the vacuum cleaner bag is weighed, placed in a vacuum cleaner, and the vacuum cleaner is then operated to pass dust in accordance with the standard mixture into the filter bag. The best known types of paper bags, when subjected to this test, collect about 20 grams of dust before the pressure drop across the bag reaches a value below which efficient operation is accomplished. Bags embodying external wrapper or support layers and internal liner layers of wadding, as described above, collect in excess of 70 grams of dust under the same conditions before the pressure drop reaches the critical value. With an applique of cotton fiber having an average length of about ⅝ inch, and in an amount of ½ ounce per square yard, in excess of 140 grams of dust can be collected by the bag unit before reaching the critical pressure drop.

From these and other related tests, it has been established that the wadding lined bag of the invention is from three to five times as efficient as the unlined bag, and this efficiency can be greatly increased by the addition of the fiber applique. These great increases in dust-collecting ability are, of course, accompanied by maintenance of adequate porosity in the bag during its now greatly increased useful life. Additionally, the new bag has an extremely high filtering efficiency, i. e., the amount of dust passing completely through the filter bag unit, was greatly reduced over that which passes through the prior known bag constructions. This problem of carry-through is quite serious in high capacity vacuum cleaners which operate at a high rate of air flow, and in some instances, it has been found necessary to use back-up filters for removing the carry-through. The filter bag construction of the present invention completely eliminates any need for back-up filters in any ordinary type of operation.

It is seen, therefore, that there is provided herein a novel vacuum cleaner bag construction comprising a porous outer bag of sufficient strength to resist bursting under the pressures exerted during the normal operation of the cleaner and a liner of fibrous material for the bag which is more porous and of greater depth than the bag. In this way, the liner is supported against rupture by the outer bag.

Various of the novel features of the invention are set forth in the appended claims.

We claim:

1. A disposable dust container for vacuum cleaners comprising a wrapper of strong, porous sheet material capable of filtering dust particles from an air stream and a liner of substantially greater porosity than said wrapper intimately associated therewith, said liner comprising from 1 to 10 plies of creped, cellulosic wadding, each having an uncreped, air-dry, basis weight within the range of 3 to 7 pounds per 2880 square feet, and a cerepe ratio within the range of 1.2 and 3.0.

2. A disposable dust container for vacuum cleaners comprising a support layer or wrapper of strong, porous sheet material having a porosity within the range of 20 to 75 cubic feet of air per minute, per square foot, at a pressure drop of ½ inch of water, and a liner of substantially greater porosity than said wrapper intimately associated therewith, said liner comprising from 1 to 10 plies of creped, cellulosic wadding, each having an uncreped, air-dry basis weight within the range of 3 to 7 pounds per 2880 square feet, and a crepe ratio within the range of 1.2 to 3.0.

3. A disposable dust container for vacuum cleaners comprising a support layer or wrapper of strong paper capable of filtering dust and having an air-dry basis weight within the range of 25 to 35 pounds per 2880 square feet and a porosity within the range of 30 to 60 cubic feet of air per minute, per square foot, at a pressure drop of ½ inch of water, and a liner of substantially greater porosity than said support layer intimately associated therewith, said liner comprising from 1 to 10 plies of creped, cellulosic wadding, each having an uncreped, air-dry basis weight within the range of 4.5 to 5.0 pounds per 2880 square feet and a crepe ratio within the range of 1.8 to 2.2.

4. A disposable, dust container for vacuum cleaners comprising an outer support layer of strong paper having a porosity within the range of 30 to 60 cubic feet of air per minute, per square foot, at a pressure drop of ½ inch of water, and an inner liner of substantially greater porosity than said support layer intimately associated therewith, said inner liner comprising from 1 to 10 plies of creped, cellulosic wadding, each having an uncreped, air-dry basis weight within the range of 3 to 7 pounds per 2880 square feet, and a crepe ratio within the range of 1.2 to 3.0, at least one surface of a ply of wadding constituting said inner liner having applied thereto a generally uniformly distributed, thin applique of fibers in an amount from ¼ to ¾ ounce per square yard of wadding.

5. A disposable, dust container for vacuum cleaners comprising an outer support layer of strong paper having an air-dry basis weight within the range of 25 to 35 pounds per 2880 square feet, and a porosity within the range of 30 to 60 cubic feet of air per minute per square foot, at a pressure drop of ½ inch of water, and an inner liner layer of substantially greater porosity than said outer layer intimately associated therewith, said liner layer comprising from 1 to 10 plies of creped, cellulosic wadding, each having an uncreped, air-dry basis weight within the range of 3 to 7 pounds per 2880 square feet, and a crepe ratio within the range of 1.2 to 3.0, the inner surface of said inner liner having applied thereto a thin, uniformly distributed, fiber applique in an amount from ¼ to ¾ ounce per square yard of wadding.

6. A disposable bag unit, as defined in claim 2, wherein the plies of cellulosic wadding are joined together by embossing, which occupies not more than 35 percent of the area of said liner, and wherein the liner is adhesively attached to the wrapper.

7. A disposable bag unit, as defined in claim 4, wherein the plies of cellulosic wadding and the applique of fibers are joined together, at least in part, by embossing which occupies not more than 35 percent of the area of said liner, and wherein the liner is adhesively attached to the wrapper.

8. A disposable dust container for vacuum cleaners, comprising an outer support and wrapper of strong paper capable of filtering dust and having an air-dry basis weight within the range of 25 to 35 pounds per 2880 square feet, and a porosity within the range of 30 to 60 cubic feet of air per minute, per square foot, at a presusre drop of ½ inch of water, and an inner liner having substantially greater porosity than said outer support intimately associated therewith, said inner liner comprising from 1 to 10 plies of creped, cellulosic wadding, each having an uncreped, air-dry basis weight within the range of 4.5 to 5.0 pounds per 2880 square feet, and a crepe ratio within the range of 1.8 to 2.2, the inner surface of said inner layer having applied thereto a thin, uniformly distributed, applique of cotton fibers having an average length within the range of ⅛ to ¾ inch, said applique being present in an amount from ¼ to ¾ ounce per square yard of liner, said wadding plies in said applique being joined together by an embossed area which occupies not more than 35 percent of the total area of said liner, and being joined to said outer wrapper by spaced areas of adhesive.

9. A disposable dust container for vacuum cleaners comprising an outer support layer of strong porous sheet material capable of filtering dust particles from an air stream and a liner of substantially greater porosity than said support layer intimately associated therewith, said inner liner comprising from 1 to 10 plies of creped, cellulosic wadding, each having an uncreped, air-dry basis weight within the range of 3 to 7 pounds per 2880 square feet and a crepe ratio within the range of 1.2 to 3.0, and a thin applique of fibers on at least one surface of a ply of said wadding.

References Cited in the file of this patent

UNITED STATES PATENTS

| | | |
|---|---|---|
| 754,053 | Derham | Mar. 8, 1904 |
| 1,368,540 | Bovard | Feb. 15, 1921 |
| 1,411,975 | Matson | Apr. 4, 1922 |
| 1,854,427 | Riebel | Apr. 19, 1932 |
| 1,897,976 | Birkholz | Feb. 14, 1933 |
| 2,225,389 | Osterdahl | Dec. 17, 1940 |
| 2,324,231 | Osterdahl | July 13, 1943 |
| 2,463,722 | Spraragen | Mar. 8, 1949 |

FOREIGN PATENTS

| | | |
|---|---|---|
| 257,711 | Great Britain | Sept. 9, 1926 |
| 512,945 | Great Britain | Sept. 29, 1939 |
| 527,228 | Great Britain | Oct. 4, 1940 |
| 120,733 | Sweden | Nov. 27, 1947 |